United States Patent [19]
van der Lely

[11] 4,262,555
[45] Apr. 21, 1981

[54] TORQUE CONVERTER

[76] Inventor: Cornelis van der Lely, 7, Brüschennain, Zug, Switzerland

[21] Appl. No.: 950,459

[22] Filed: Oct. 11, 1978

[30] Foreign Application Priority Data

Oct. 14, 1977 [NL] Netherlands .................. 7711277

[51] Int. Cl.³ ............................................ F16H 37/06
[52] U.S. Cl. .................................... 74/690; 74/796
[58] Field of Search ............... 74/690, 191, 192, 190, 74/796

[56] References Cited

U.S. PATENT DOCUMENTS

| | | | |
|---|---|---|---|
| 1,194,107 | 8/1916 | Whiteside | 74/690 |
| 1,762,199 | 6/1930 | Standish | 74/690 |
| 1,938,605 | 12/1933 | Mottlau | 74/690 |
| 2,062,901 | 12/1936 | Graham | 74/690 X |
| 2,686,432 | 8/1954 | Bergmann | 74/690 X |
| 2,807,964 | 10/1957 | Oushinsky | 74/191 X |
| 3,241,382 | 3/1966 | Temple | 74/191 |

FOREIGN PATENT DOCUMENTS 1189823 3/1965 Fed. Rep. of Germany ............ 74/690
1205687 2/1960 France ........................................ 74/191

*Primary Examiner*—Nile C. Byers, Jr.
*Attorney, Agent, or Firm*—William B. Mason

[57] ABSTRACT

A torque converter has a driving shaft that frictionally drives an in-line driven shaft via rollers having transmission gears. The rollers are tapered and mounted on arms linked to a carrier that is splined to the driving shaft. The rollers are freely rotatable about axes inclined to the shafts and pivotable about respective pivotal shafts to engage a surrounding contact surface responsive to centrifugal forces. The contact surface is part of a control ring on a holder that is journalled to the driving shaft and the ring is connected to the converter housing to prevent turning. The contact surface, pivotal shaft axes and roller axes are all inclined to the center line of the driving shaft and if prolonged, intersect that line. The holder and ring can be axially displaced along the driving shaft to change the torque; the smaller diameters of the rollers turn the driven shaft slower.

19 Claims, 5 Drawing Figures

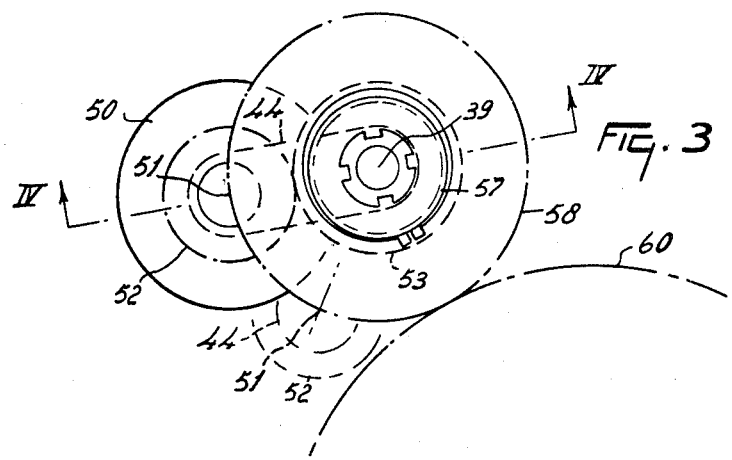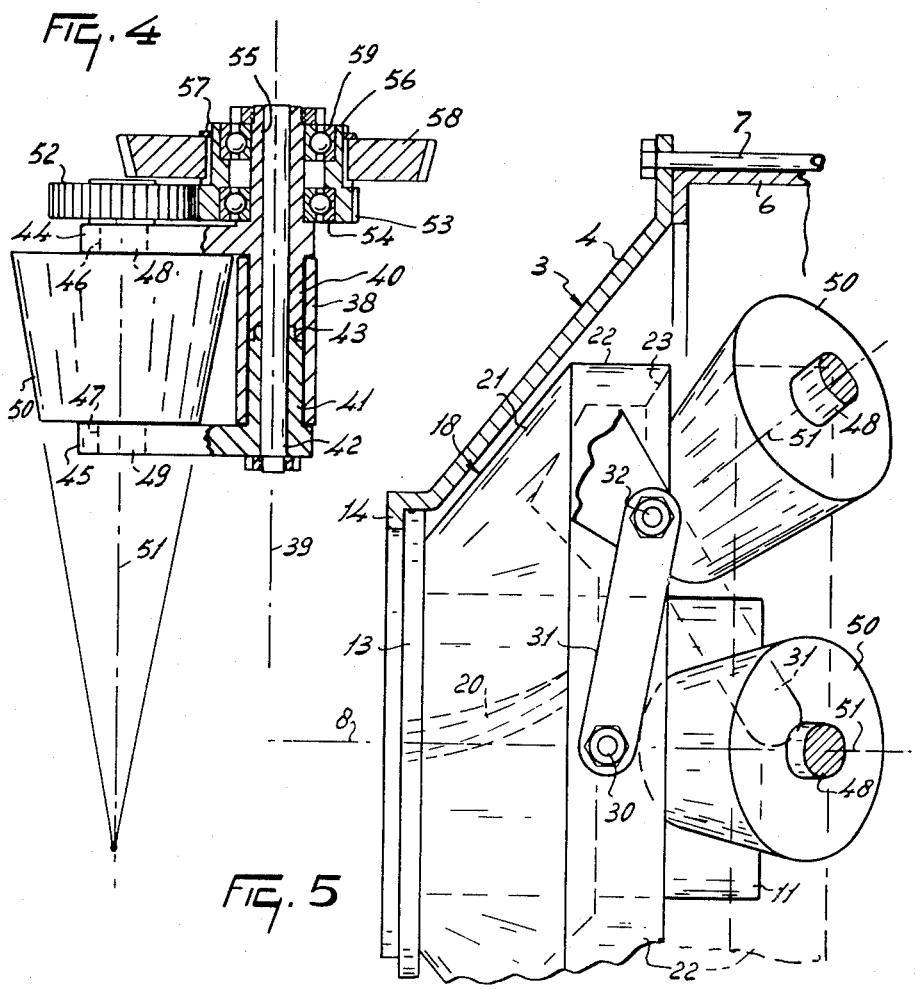

TORQUE CONVERTER

The invention relates to a torque converter comprising a driving shaft and a frictional drive by means of at least one rotatable frictional element which is in engagement with a contact surface against which the element can rotate.

According to the invention during operation in at least two working positions the prolongation of the line of contact between the frictional element and the contact surface and the prolongation line of the rotary axis of the frictional element intersect one another approximately at the center line of the driving shaft.

In the past many torque converters using friction elements have been designed without much success. One of the disadvantages of these torque converters have been the losses caused by the friction. With the torque converter according to the invention these losses are however prevented, saving fuel and energy.

For a better understanding of the invention and to show how the same may be carried into effect reference will be made by way of example to the following Figures.

FIG. 3 is a schematical elevational view in the direction of the arrow III in FIG. 1.

FIG. 4 is a sectional view taken on the lines IV—IV in FIG. 3.

FIG. 5 is an elevational view in the direction of the arrow V in FIG. 1.

Figure 1:
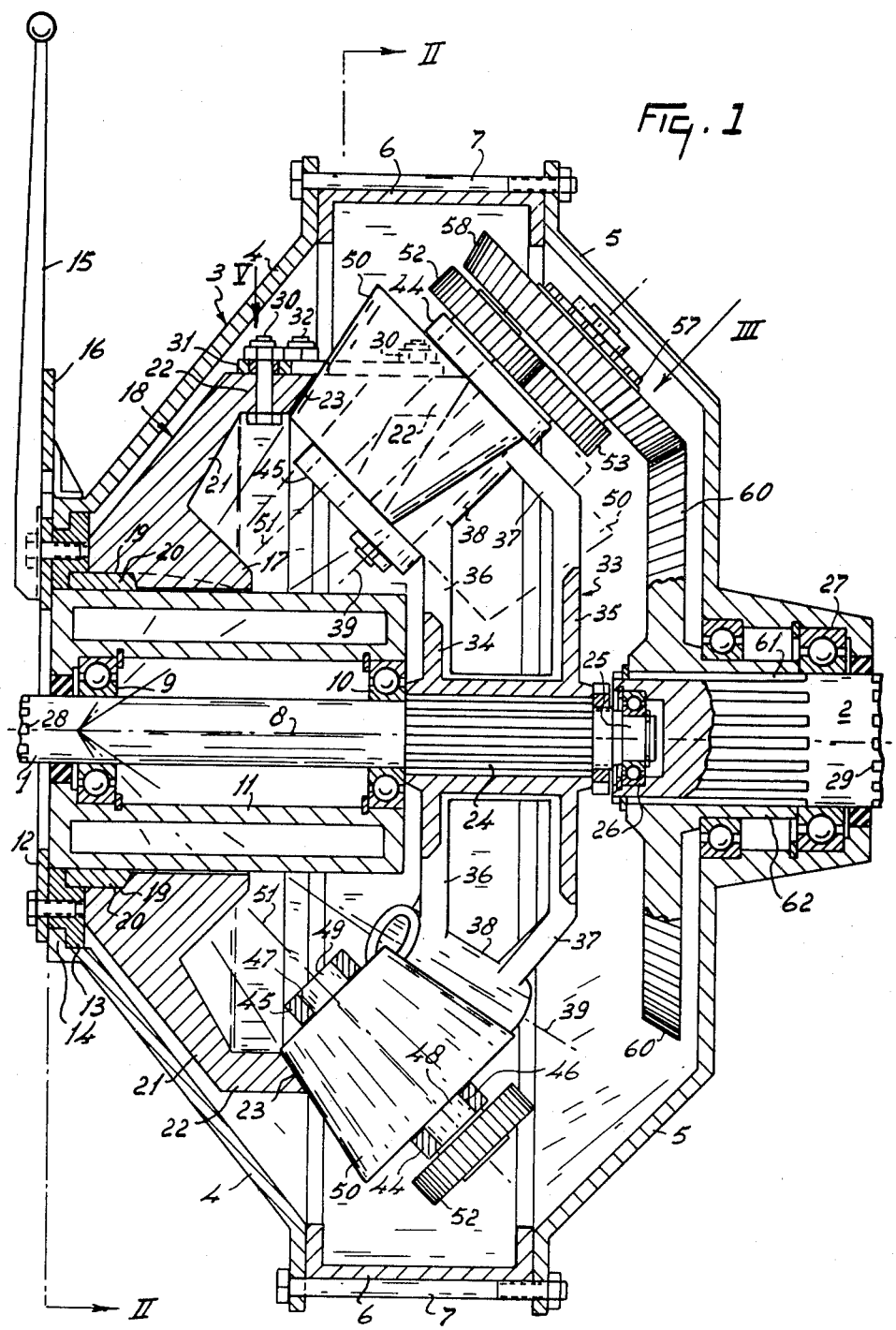
FIG. 1 is a sectional view of the torque converter in accordance with the invention.

The torque converter comprises an input or driving shaft 1 as well as a driven shaft 2, both being journalled in a housing 3 comprising spaced apart portions 4 and 5. The housing portions 4 and 5 are rigidly secured to one another by means of a cylindrical portion 6 of the housing 3 by bolts 7. The center lines of the driving shaft 1 and of the driven shaft 2 coincide on a common center line 8 (FIG. 1).

The driving shaft 1 is rotatably journalled by means of axially spaced bearings 9 and 10 in a holder 11 having substantially the shape of a cylindrical sleeve with the shaft 1. On one side of the torque converter, the holder 11 is secured to a setting ring 12, which is also coaxial with the center line 8 and which extends at right angles to said center line. To the setting ring 12 is secured a guide ring 13, which is shaped so that the assembly of the setting ring 12 and of the guide ring 13 embraces a flange 14 of the housing portion 4, also coaxial with the center line 8 so that said assembly can turn about the center line 8 with respect to the flange 14. In order to carry out such a turn the setting ring 12 is provided with a lever 15, by which said movement can be performed. The housing portion 4 has secured to it a sector-shaped locking plate 16, with respect to which the lever 15 as well as the assembly of the setting ring 12, the guide ring 13 and the holder 11 can be fixed in place relative to the housing 3 by means of a clamping member (not shown). The locking plate 16 is constructed so that the setting device formed by the components 11, 12, 13, 15 can be turned through an angle of about 150° around the center line 8.

The holder 11 supports a control-ring 18, which is coaxial with the center line 8 and which is displaceable axially with respect to center line 8. For this purpose a foot 17 of the control-ring 18 has a cavity 19 adapted to receive a ridge 20. The ridge 20 (see also FIG. 5) is formed by an elongated rib on the outer surface of the holder 11, the upright boundary faces of which are at an angle of about 22° to a radial plane going through the center line 8. The cavity 19 in the foot of the control-ring 18 has boundary faces fitting around the ridge 20. The arrangement is such that with the lever 15 the ring 18 can be shifted axially.

The portion 21 of the control-ring 18 is inclined outwardly from the driving shaft and changes into a portion 22 of cylindrical shape coaxial with the axis 8. The portion 22 has a surface 23 the prolongation line of which, as seen in the section according to FIG. 1, intersects the center line 8 as indicated by a dotted line in FIG. 1.

To the control-ring 18 is mounted a shaft 30 and a guide rod 31 (FIGS. 1 and 5), the other end of said rod being mounted to the housing 4 by means of a shaft 32 extending parallel to the shaft 30. This assembly will prevent the ring 18 from rotating.

The portion of the input shaft 1 protruding from the holder 11 has splines 24 and a stub 25, which is supported in a bearing 26, sustained in the output shaft 2. The input shaft 1 is thus rotatably supported by the output shaft 2. With respect to the housing portion 5 the output shaft 2 is supported in a bearing 27. The portions of the input shaft 1 and of the output shaft 2 emerging from the housing 3 have axial splines 28 and 29, to which a driving device and a driven device can be connected respectively.

Figure 2:
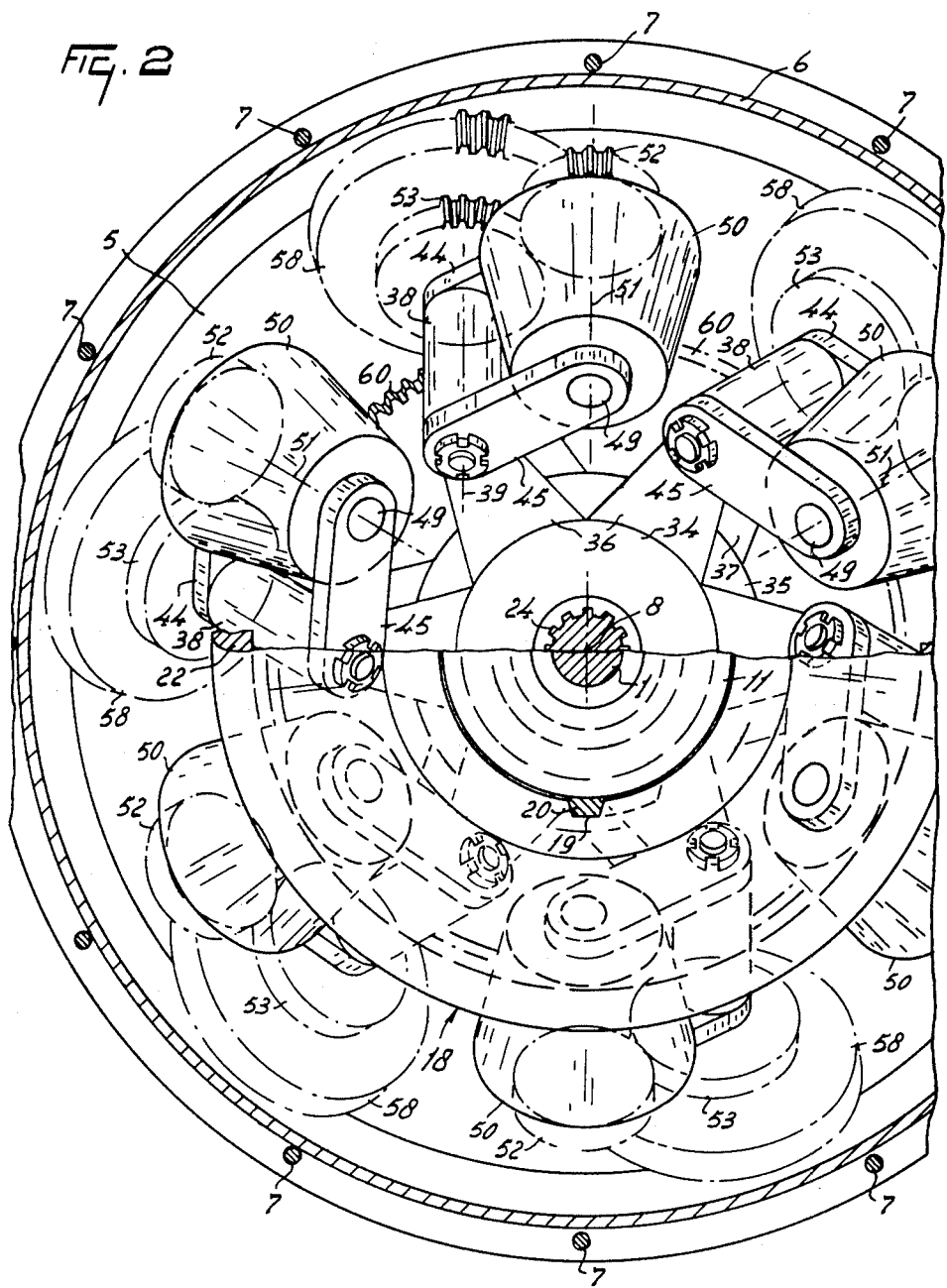
FIG. 2 is a sectional view taken on the lines II—II in FIG. 1.

On the splines 24 of the shaft 1 is mounted a carrier 33 having internal splines fitting to the splines 24. The carrier 33 comprises two axially spaced, annular walls 34 and 35. The walls 34 and 35 are provided with six pairs of supports 36 and 37 (FIGS. 1 and 2), which like the walls 34 and 35 are at right angles to the center line 8. The outer part of the support 37 is however bent at an angle of about 45°. The ends of each of the six pairs of supports 36 and 37 hold a sleeve 38 (FIG. 1, 2 and 4), the center line 39 of which being at an angle to the shaft 1 and crossing its center line. Between the bearings 9 and 10 the distance between the center line 39 and the center line 8 is at its smallest. The sleeve 38 (FIG. 4) surrounds two tubular portions 40 and 41 located axially one near the other and having both a bore for passing a shaft 42 serving as a pivotal shaft, the center line of which coincide with the center line 39. The tubular portion 41 is provided at its end facing the tubular portion 40 with a part 43 having a square shape, viewed in a direction parallel to the center line 39. The part 43 fits into a cavity in the end of the tubular portion 40 directed towards the tubular portion 41 so that, when the part 43 is located in the cavity in the tubular portion 40 of the tubular portions 40 and 41 are relatively fixed when they turn about the center line 39. The tubular portion 40 has an arm 44 while the tubular portion 41 is provided with an arm 45. The two arms 44 and 45 have bores 46 and 47 holding stub shafts 48 and 49 supporting a driving or frictional element 50, which is freely rotatable with respect to the arms 44 and 45. The driving element 50 is hingeably mounted to the center line 39 with the sleeve 38 by means of the holder formed by the portions 40, 41, 44 and 45. Each driving or frictional element 50 has the shape of a tapered or conical roller, the outer surface being part of a conical surface, the axis of which coincides with the coinciding center lines 51 of the bores 46 and 47 and of the stub shafts 48 and 49.

The center line 51 is parallel to the center line 39 of a pivotal shaft. In the working position the imaginary summit of the conical surface, part of which is formed by the roller 50, is located on the center line 8 as shown in FIG. 1. Therefore, the axis of the conical surface intersects the center line 8. The disposition of each of the six rollers 50 is such (FIG. 1) that the smaller diameter of each roller 50 is located at a smaller distance from the driving shaft 8 than the larger diameter of the frictional element 50.

When the roller 50 is in engagement with the conical surface 23 of the control-ring 18 (FIG. 1), as is the case in all working positions of the torque converter, the conical plane, part of which is formed by the surface 23, will intersect approximately in the center line 8 by the center lines 51 of the six rollers 50 and also by the generatrices of the conical roller surfaces 50. The generatrix of each roller 50 tangential to the contact surface 23 is at the same time the generatrix of the conical plane associated with the surface 23.

In the torque converter shown in FIG. 1 the center lines 51 are at an angle of 45° to the center line 8, however other angles can be applied. The stub shaft 48 on the side of the roller 50 having the larger diameter is prolonged and holds a gear wheel 52, which is in mesh with a gear wheel 53, which is freely rotatable by means of a bearing 54 around the pivot axis 39. The gear wheel 52 is rigidly secured to the stub shaft 48 and in fixed relation to the driven element 50. The gear wheel 53 is integral with a sleeve-like portion 56 of the gear wheel 58 by the splines 57. The gear wheel 48 like the gear wheel 53 is coaxial with the center line 39. Consequently, when the rollers 50, which are freely pivotable together with the arms 44 and 45 with respect to the sleeve 38, perform a movement about the center line 39, the gear wheel 52 rigidly secured to the roller 50 will be constantly in driving engagement with the gear wheel 53 and hence with the gear wheel 58. It should be noted that in this embodiment the pitch circle of the gear wheel 52 is smaller than that of the gear wheel 53, the latter being smaller than the pitch circle of the gear wheel 58.

The six assemblies, one of which is shown in FIG. 4, are fastened by means of the carrier 33 to the input shaft 1 and these assemblies are rotating around the center line 8. The position of the center line 39 with respect to the center line 8 is invariable so that during rotation the gear wheel 58 maintains the same position relative to the shaft 2.

The six gear wheels 58 are in mesh with a gear wheel 60, which is coaxial with the output shaft 2 and fixed by means of splines 61 to the output shaft 2. The gear wheel 60 is at right angles to the center line 8 and is integral with a sleeve-like part 62 extending coaxially with respect to the shaft 2 from the gear wheel 60 towards the bearing 27. Gear wheels 58 and 60 are bevel gears.

The torque converter is suitable e.g. for use as variable speed transmission in stationary drives and in vehicles e.g. in automobiles and tractors. The torque converter is continually adjustable and operates as follows:

During operation the input shaft is driven by a driving engine at a rate of, for example, 2000 RPM. The carrier 33 rotates with the shaft 1 and hence also the driving or frictional elements 50 mounted to the carrier 33 rotate around the center line 8. Owing to the rotation of the carrier 33 each of the rollers 50 will swing outwardly by centrifugal force about the pivotal shaft 42 together with the arms 44 and 45. As shown in FIG. 1 the outward swing of each roller 50 is limited because the conical surface of the roller will come into contact with the surface 23 of the control-ring 18, which is coaxial with the center line 8, said surface 23 forming a contact surface for the rollers 50. The position shown by solid lines in FIG. 1 is such that the contact surface 23 engages that portion of the conical outer surface of the rollers 50 which is located directly adjacent the smallest diameter of each of said rollers. Therefore, each of the rollers 50 will be in contact by its generatrix with at least a great part of the width of the contact surface 23. The summit of the conical plane associated with the surface 23 is located on the center line 51 of each roller and also on the center line 8 of the input shaft 1, said summit coinciding with the summits of the conical planes associated with the rollers 50. Therefore, when a roller 50 rolls against the contact surface 23 of the control ring there will be no difference in speed between a certain part of the roller and the control ring with respect to another part of the roller and the control ring. This means that slip will be prevented and the energy losses will be negligible.

In the position shown in FIG. 1 each roller 50 is urged by centrifugal force against the contact surface 23. Each roller 50 rolls against this contact surface 23 thereby rotating about the axis 51. The dimensions are such that the contact pressure produced by the centrifugal force between each of the rollers 50 and the contact surface 23 has such a value that the frictional force between the surface 23 and the surface of the rollers 50 produces a torque which is in equilibrium with the torque required for driving the driven implement without the occurrence of slip between the surface 23 and the rollers 50. This absence of slip is caused by the geometric dispositions described above. The contact surface between the control ring and the roller need not be exactly straight and can be curved somewhat however, during operation the roller will press very hard against the contact surface so that a line will be produced, said line of contact having a prolongation that will intersect approximately at the center line 8 with the prolongation of the axis 51. The choice of material of the surface 23 and of the rollers 50 depends, of course, on the forces; for the surface of the rollers 50 a hard steel material is preferred. Owing to the friction between the rollers 50 and the contact surface 23 the torque transmission can be called a friction drive, although friction in the sense of slip is to be minimized.

The expression "friction" in this description has to be understood in this way.

Since the rollers 50 roll along the contact surface 23, the associated gear wheels 52 drive the gear wheels 53 mounted arond the center lines 39. At the same time the gear wheels 58 are driving the gear wheel 60 on the output shaft 2.

When, starting from of the position shown by solid lines in FIG. 1 the lever 15 and hence the setting ring 12, the guide ring 13 and the holder 11 are turned, the wedges 20 fastened to said parts and being inclined to the axial direction will displace via the cavities 19 the control-ring 18 in an axial direction, so that the foot 17 of the control-ring 18 slides along the cylindrical outer surface of the holder 11, while the guide rod 31, which prevents the turning of the control-ring 18, will turn about the pivotal shafts 30 and 32. This means that the control-ring 18 will shift into a position closer to the housing portion 5. These positions of the control-ring 18 are limited by an outermost position indicated by dotted lines in FIG. 1.

In each of the potential positions of the control-ring 18 each roller 50 will engage the contact surface 23 with another part of the roller and with another diameter of the roller. For obtaining a new position a roller 50 will turn about the pivotal shaft 42 or the center line 39. The dimensions are such that, when the center line 51 intersects with the center line 8 in the position indicated in FIG. 1 by solid lines, the center line 51 may intersect the center line 8 in the extreme position indicated in FIG. 1 by dotted lines.

In order to achieve optimum efficiency of the torque converter it is, therefore, important that in the most frequent setting of the vehicle, at the highest load of the torque converter, the control-ring obtains a position in which the center line 51 exactly intersects the center line 8 so that no slip losses will occur. In the position of the control-ring indicated by solid lines, in which the contact surface 23 is in contact with the smallest diameter of the roller 50, the output shaft 2 is driven with the lowermost speed. In this position the torque converter has, consequently, a high degree of efficiency, since no slip occurs in the torque converter and cooling means therefore are superfluous.

In the embodiment shown, with a speed of the input shaft 1 of 2000 RPM, each roller 50 may have a speed variable between 5300 and 7000 RPM, in which range the output shaft 2 may rotate with a speed of 140 to 1660 RPM.

In the position indicated by dotted lines in FIG. 1 of the control-ring 18, the rollers 50 are in engagement by their largest diameter with the contact surface 23, in which case the aforesaid higher speeds are obtained.

In this case and also in the intermediate positions of the control-ring 18 the rollers are located with a large part of their circumference in the hollow part of the control-ring so that the contact area between the two parts will be large, preventing slip at low speeds.

The torque converter according to the invention is capable of driving the output shaft in a range of speeds for example, with a variation of one to ten.

Since in the position in which the rollers 50 are in contact with the control-ring 18 by their smallest circumference, the output shaft rotates with the lowest speed, a roller of a slightly smaller diameter due to wear or another reason will transfer a lower force. This has the advantage that the rollers will not wear irregularly. The transmission of the torque converter is, therefore, such that a driving or frictional element having a smaller circumference, for example, due to wear, automatically transfers a lower power than an element in engagement with its initial circumference for driving the output shaft.

The invention is not limited to the statements made in the description and/or in the claims, but also relates to the details of the Figures, which may not have been described.

What we claim is:

1. A torque converter comprising a driving shaft in driving engagement with a driven shaft through a plurality of rollers that frictionally engage a contact surface, said surface comprising non-rotatable ring means that surrounds one of said shafts and said rollers being supported on a carrier fixed to said driving shaft, said rollers having planetary transmission gears that engage a sun gear on said driven shaft, said rollers being linked to the carrier through respective pivotal shafts that are angled to the driving shaft and displaceable away from that shaft into engagement with said surface responsive to centrifugal force, said rollers being freely rotatable about respective axes that are spaced from the driving shaft and the pivotable shafts.

2. A torque converter as claimed in claim 1, wherein the rollers are tapered and the smaller diameters of said rollers transmit lower speeds and higher driving torques to the driven shaft.

3. A torque converter comprising a driving shaft in driving engagement with a driven shaft through a plurality of rollers that frictionally engage a contact surface, said surface comprising ring means that surrounds one of said shafts and said rollers being freely rotatable supported on a carrier fixed to said driving shaft, said rollers having planetary transmission gears that engage a sun gear on said driven shaft, said rollers being linked to the carrier through respective pivotal shafts that are angled to the driving shaft and displaceable away from the shaft into engagement with said surface responsive to centrifugal force, said ring means being held against rotation and said rollers being freely rotatable about respective axes that are spaced from the driving shaft and the pivotable shafts.

4. A torque converter as claimed in claim 3, wherein the prolongation of the lines of contact of the rollers with said surface and the prolongation lines of the rotational axes of said rollers intersect one another substantially at the center line of said driving shaft.

5. A torque converter as claimed in claim 4, wherein said ring means is slideably mounted on a holder journalled to the driving shaft and means adjusting the relative position of said ring means with respect to said rollers to change the transmission ratio, said rollers being tapered.

6. A torque converter comprising a driving shaft and a frictional drive to a driven shaft, the drive connection comprising at least one rotatable frictional element in rotary engagement with a contact surface, said element being freely rotatable and in driving engagement with said surface during operation in a plurality of working positions, the prolongation of a line of contact between said element and said contact surface being angled to the prolongation line of the rotary axis of said element, the prolongation lines intersecting one another approximately at the center line of said driving shaft in said working positions, gear means drivingly interconnecting said element with said driven shaft.

7. A torque converter as claimed in claim 6, wherein each element is a conical roller having a surface the imaginary summit of which intersects the center line of said driving shaft approximately at the same location as the prolongation line of said contact surface, said contact surface being formed by a ring that is displaceable along the length of said driving shaft.

8. A torque converter as claimed in claim 5, wherein said contact surface is part of a control ring and said surface is inclined to the input shaft, said ring being slidably mounted in axial direction on said driving shaft to change the working position of the roller relative to said surface.

9. A torque converter comprising a driving shaft and a frictional drive to a driven shaft, the drive connection comprising tapered rollers in rotary frictional engagement with a contact surface, each roller being hinged to a carrier mounted on said driving shaft and freely rotatable about a respective axis, said roller being responsive to centrifugal forces and pivotable to driving engagement with said surface during operation, the prolongation of a line of contact between said roller and said contact surface being angled to the prolongation line of the rotary axis of said roller, the prolongation lines intersecting one another approximately at the center line of said driving shaft in a plurality of working positions, transmission means drivingly interconnecting said roller with said driven shaft.

10. A torque converter as claimed in claim 9, wherein said roller is hinged to said carrier by pivotable arm means, the prolongation line of the pivot axis of said roller also intersecting the prolongation line of contact between the roller and said surface and the prolongation line of the rotary axis of said roller at approximately the center line of said driving shaft.

11. A torque converter as claimed in claim 10, wherein the larger diameter of said roller is at a further distance from said driving shaft than the smaller diameter of the roller, said contact surface being part of a non-rotatable ring that is settable along the length of said driving shaft, whereby said driven shaft can be rotated at variable rpm.

12. A torque converter as claimed in claim 11, wherein said roller pivots outwardly under centrifugal force and bears against said contact surface during rotation of the input shaft, the pivot axis of said roller being spaced a distance from said input shaft and the axis of roller rotation.

13. A torque converter as claimed in claim 12, wherein said roller has a conical surface the vertex of which is located on the center line of said driving shaft, said contact surface forming part of a conical plane the vertex of which is also located on said center line, the generatrix of the roller coinciding with the generatrix of said contact surface.

14. A torque converter comprising a driving shaft and a frictional drive to a driven shaft, the drive connection comprising tapered rollers in rotary frictional engagement with a non-rotatable contact surface, said rollers being hinged to a carrier that is mounted on said driving shaft and said surface defining a conical plane that is coaxial with and surrounds said driving shaft, each roller being freely rotatable about a respective axis and pivotable about a pivot axis by centrifugal force to driving engagement with said surface during rotation of said driving shaft, a line of contact between said roller and said contact surface being angled to the rotary axis of that roller element and to the center line of said driving shaft, transmission means drivingly interconnecting said roller with said driven shaft.

15. A torque converter as claimed in claim 14, wherein the conical plane of said roller is located within the conical plane of said contact surface and said contact surface is part of an adjustable control-ring which is axially displaceable and fixable in a plurality of positions relative to said driving shaft.

16. A torque converter as claimed in claim 15, wherein the rotary axis of said roller extends at an angle of about 45° to the center line of said driving shaft and there are six frictional rollers mounted on said carrier.

17. A torque converter as claimed in claim 14, wherein said roller is linked to said carrier via a holder having pivotable arm means, a first gear wheel mounted on the axle of said roller and said wheel being in mesh with a second gear wheel rotatably journalled on a pivotal shaft that defines said pivot axis, a third gear wheel journalled on said pivotal shaft and said third gear wheel being fixed to said second gear wheel.

18. A torque converter as claimed in claim 17, wherein the third gear wheel is a planetary wheel in mesh with a sun wheel and the latter is coaxial and fixed to said output shaft.

19. A torque converter as claimed in claim 14, wherein said driving shaft is rotatably connected to the driven shaft and the two shafts are in line with one another, one end of the driving shaft being freely rotatably supported in an adjacent end of said driven shaft.

* * * * *